Patented Oct. 25, 1927.

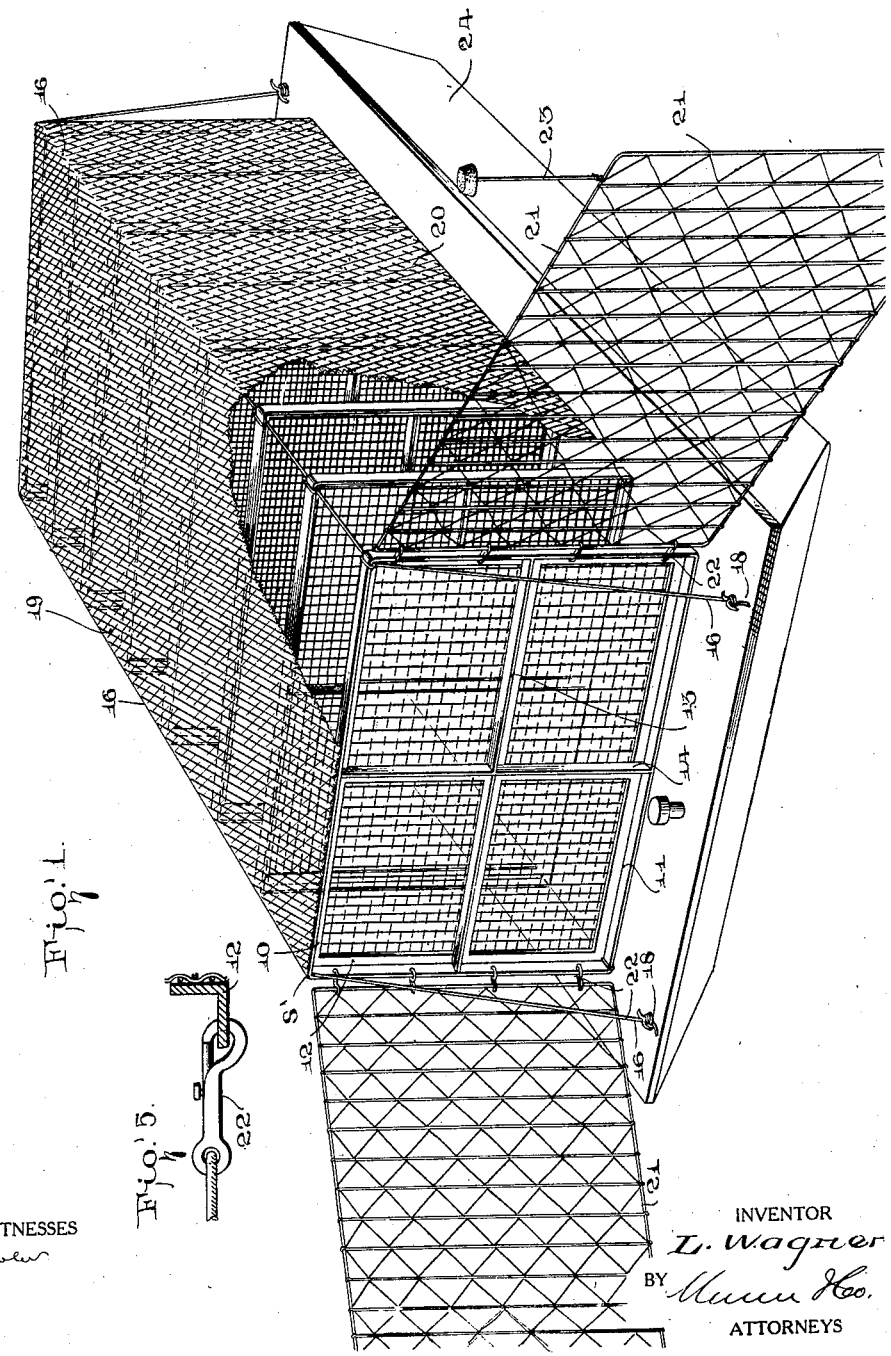

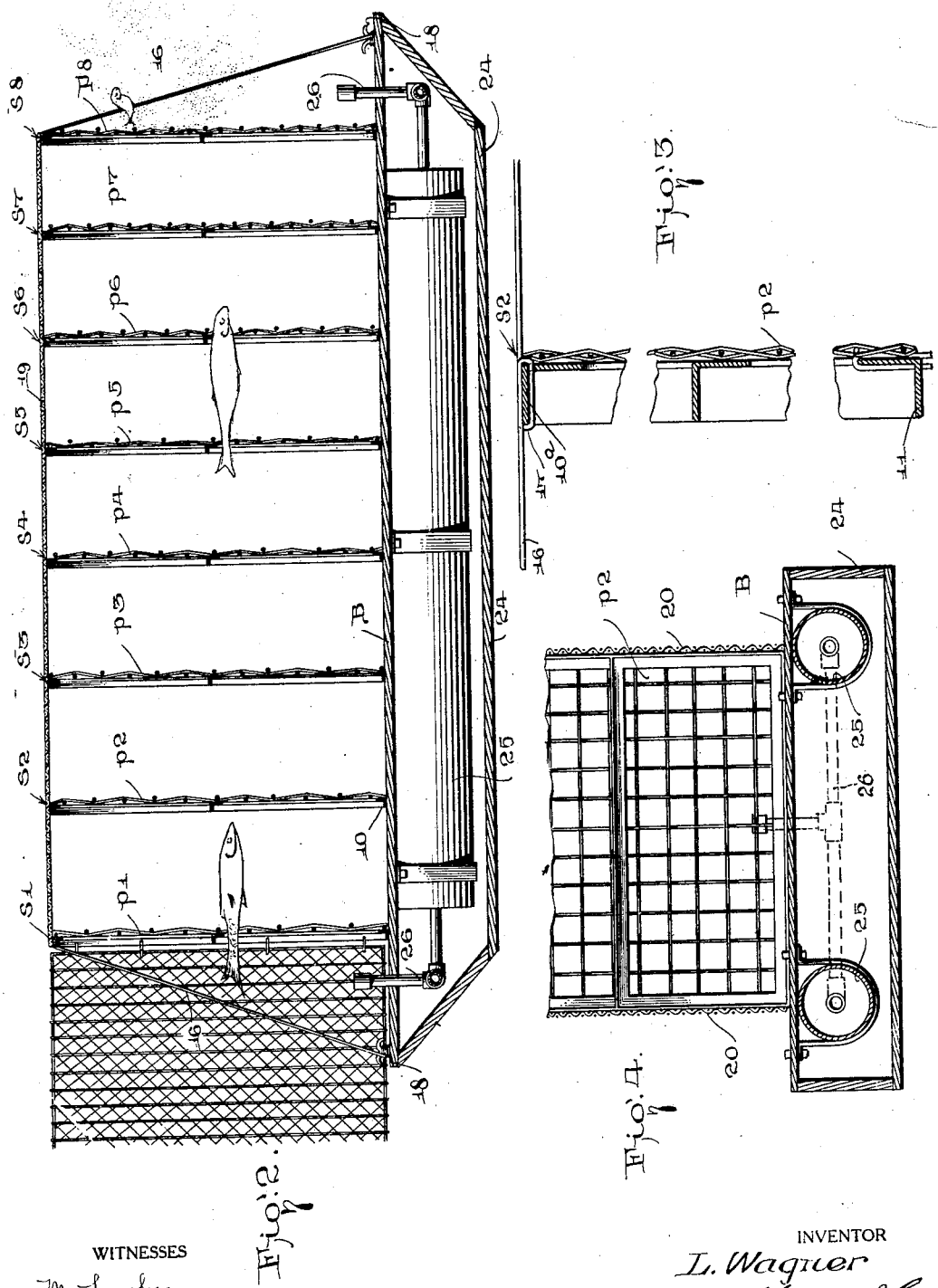

1,647,027

UNITED STATES PATENT OFFICE.

LAWRENCE WAGNER, OF SEDALIA, MISSOURI.

FISH TRAP.

Application filed January 4, 1927. Serial No. 158,982.

My invention relates to improvements in fish traps, and it consists in the combinations, constructions and arrangements herein described and claimed.

More specifically defined, the present invention aims to provide a trap which can be used repeatedly to snare garfish so that such garfish cannot escape accidentally from the trap but can be removed from the trap when desired without there being any necessity of cutting or otherwise breaking the trap in the manner that would be required to free garfish from a trammel net or other seining device.

A further object of the invention is the provision of a trap of the character described which affords facilities for retaining garfish of different sizes in different portions of the trap.

A still further object of the invention is the provision of a trap of the character described which is simple is construction, reliable in use, not likely to get out of order easily and thoroughly practical commercially.

Other objects and advantages of the invention will be apparent from the following description, considered in conjunction with the accompanying drawings, in which Figure 1 is a perspective view of a trap embodying the invention, Figure 2 is a longitudinal vertical section through the improved trap, Figure 3 is a relatively enlarged fragmentary vertical section through one of the trapping sections of the device, showing in elevation certain of the elements of the securing means for the trapping sections, and Figure 4 is a fragmentary transverse vertical section through the trap, and Figure 5 is a relatively enlarged fragmentary detail sectional view of part of the means for detachably connecting one of the wings at the inlet end of the trap to the body of the trap.

A trap embodying the invention includes a plurality of spaced parallel upright snaring sections, indicated at $S^1$ to $S^8$, inclusive on a flat base B. Each of the snaring sections may comprise a substantially rectangular frame consisting of a pair of parallel top and bottom bars 10 and 11, respectively, a pair of parallel side bars 12, a horizontal middle reinforcing bar 13, and a vertical middle reinforcing bar 14, all joined together in any suitable known manner so as to produce a relatively strong unitary frame structure.

The members of the frames of the snaring sections may be angle irons as shown. These angle bars of each frame preferably are arranged so that flanges thereof extend inwardly from the perimeter of the frame at one edge of the frame.

The frames of the snaring sections have foraminous channels or sheets of wire mesh, as at $P^1$ to $P^8$ inclusive, secured by welding or in any other suitable known manner to the members of said frames, preferably against the inturned flanges of said frames, so that the foraminous panels close or cover corresponding faces of the respective frames. The meshes of the foraminous panels of the snaring sections $S^1$ to $S^8$ inclusive are graduated in size, the meshes of the panel $P^1$ of the snaring section $S^1$ being largest and the meshes of the panel $P^8$ of the snaring section $S^8$ being the smallest of the meshes of the respective snaring sections.

The snaring sections are secured firmly, although releasably, to the base B by any suitable known fastening devices, such as staples $10^a$ which clamp the bottom bars of the frames of the snaring sections to the base B so that the frames of the respective snaring sections will be parallel with each other and adjacent snaring sections will be spaced on the base B distances which vary according to the sizes of the meshes of the foraminous panels of such snaring sections. In other words, the distance between the snaring sections $S^1$ and $S^2$ is greater than the distance between any other two adjacent snaring sections of the device and the distances between adjacent sections after the section $S^1$ then decrease regularly with the sections so that the distance between the sections $S^7$ and $S^8$ is less than the distance between any other two adjacent sections of the device.

The respective snaring sections are stayed to each other at their upper corners by tie wires 16 which extend between corresponding upper corner portions of the frames of adjacent snaring sections and have convolutions drawn tightly around the upper corner portions of the frames of said sections as indicated at 17 and as best seen in Figure 3, the end portions of the tie wires 16 being secured at their extremities to the base B at opposite ends of the series of snaring sections, as at 18. The complete tie wires 16 thus will be kept desirably taut and adjacent snaring sections will be stayed to each other.

The top and the opposite sides of the series of snaring sections may be covered by a foraminous top cover 19 and foraminous side covers 20. The cover members 19 and 20 preferably are integral with each other and the top cover member 19 extends across the upper edges of all the snaring sections while the side covers 20 extend across the side edges of all the snaring sections down to the base B. The meshes of the top cover 19 and the side covers 20 preferably are relatively small and the top and side covers are retained in place on the snaring sections in any suitable known manner, as by being attached releasably to the base or to the frames of the snaring sections or to both the base and the frames of the snaring sections so that the cover members 20 and 19 can be displaced from the snaring sections when desired for a purpose which will presently appear.

A pair of wing members 21 are shown as being rectangular in form and as being made of foraminous material of relatively small mesh. The wing members 21 are attached at their inner ends detachably, as by means of the snap hooks 22, to the side bars 12 of the frame of the section S¹ of the device. The wings 21 diverge toward their outer ends as shown in Figure 1 so as to guide fish which have swum between the outer ends of the wings toward the snaring frame section S¹. Stay rods, as at 23, may connect the outer end portions of the wings with the base and retain the outer ends of the wings 21 against swinging from adjusted positions with respect to each other.

The base B may be the top of the hull 24 of a boat, which can be submerged in water when desired and which is provided on its opposite sides with chambers 25 having pipes 26 connected therewith through which air can be conducted into the chambers 25 when desired to effect raising of the boat with the trap thereon after such boat and trap have been submerged.

From the foregoing description of the various parts of the device, the operation thereof may be readily understood. The trap is intended primarily for use in streams of from 125 to 150′ in width and the snaring sections of the trap preferably are sufficiently wide to adapt the trap to extend across a substantial part of the stream in which the trap is used. The support for the trap is sunk in the stream so that the section S¹ will be located at the upstream end of the trap. As is well known, garfish prey on other fish and such smaller fish may pass freely through the meshes of the snaring sections of the trap. Adjacent snaring sections are located apart a distance less than the length of the garfish which they are intended to snare and garfish of various sizes may pass through the snaring section S¹ and possibly through the meshes of one or more of the remaining sections until each garfish that has entered the trap reaches a snaring section through which it cannot pass. As hereinbefore stated, the distances between adjacent snaring sections as well as the sizes of the meshes of the snaring sections are graduated so that the head end portion of the garfish will become wedged in a mesh of a snaring section while the tail end portion of that garfish extends through a mesh of the preceding snaring section. Garfish thus will be prevented from turning between adjacent snaring sections and returning through the trap and therefore the garfish which have entered the trap will be retained by two adjacent snaring sections. When desired, air will be pumped into the compartments or reservoirs 25 to effect raising of the boat with the trap thereon and the cover 20—19—20 or part of such cover may be removed from the snaring sections and the garfish removed from the snaring sections and destroyed or used for fertilizer or other useful purpose.

The respective snaring sections may be replaced when required and it is obvious that the trap may comprise any desirable number of these snaring sections and that the respective snaring sections may have meshes of any predetermined sizes.

Obviously, the invention is susceptible of embodiment in forms other than that which is illustrated in the accompanying drawings and I therefore consider as my own all such modifications and adaptations thereof as fairly fall within the scope of the appended claims.

I claim:—

1. A trap of the character described comprising a plurality of spaced parallel upright apertured snaring sections, the apertures of said sections being graduated as to size so that fish of varying sizes may be caught and held by their heads.

2. A trap of the character described comprising a plurality of spaced parallel upright apertured snaring sections, the apertures of said sections being graduated as to size, the distances between adjacent snaring sections being graduated according to the sizes of the apertures of the respective snaring sections whereby fish of varying sizes may be caught and held by their heads and tails.

3. A trap for garfish comprising a base, a plurality of spaced parallel upright foraminous snaring sections secured on said base and extending transversely of the base, said sections being so spaced that fish of varying sizes may be caught by their heads and tails and held to prevent them from turning in the snare, the meshes of the respective snaring sections being graduated as to size, and a pair of outwardly flaring foraminous wings connected at their inner ends with the side edges of the snaring section that has meshes of the largest size.

4. A trap of the character described comprising a base, a plurality of spaced parallel upright snaring sections secured on said base, each of said snaring sections comprising a marginal frame and a foraminous panel secured to the frame, the meshes of the panels of the respective snaring sections being graduated as to size, the snaring section at one end of the trap having the largest meshes and the snaring section at the opposite end of the trap having the smallest meshes, the distance between each two adjacent snaring sections being less than the length of a garfish having a cross sectional area greater than that of the meshes of the more forward of said two adjacent snaring sections.

5. A trap for garfish comprising a base, a plurality of spaced parallel upright snaring sections disposed on the base, each of said sections comprising a substantially rectangular marginal frame and crossed horizontal and vertical reinforcing bars, and a foraminous sheet covering one face of the frame and secured to the frame, the meshes of the foraminous sheets of the respective snaring sections being graduated as to size, means detachably securing the lower members of the frames of said snaring sections to the base so that the distances between adjacent snaring sections are graduated according to the sizes of the meshes of the snaring sections, a pair of outwardly flaring substantially rectangular wings detachably connected at their inner ends with the side members of the frame of the snaring section which has the largest meshes, and tie members connecting the upper corners of the respective snaring sections to each other and connecting the end snaring sections to said base.

6. A trap for garfish comprising a base, a plurality of spaced parallel upright snaring sections disposed on the base, each of said sections comprising a substantially rectangular marginal frame and crossed horizontal and vertical reinforcing bars, and a foraminous sheet covering one face of the frame and secured to the frame, the meshes of the foraminous sheets of the respective snaring sections being graduated as to size, means detachably securing the lower members of the frames of said snaring sections to the base so that the distances between adjacent snaring sections are graduated according to the sizes of the meshes of the snaring sections, a pair of outwardly flaring substantially rectangular wings detachably connected at their inner ends with the side members of the frame of the snaring section which has the largest meshes, and a foraminous cover for the tops and sides of all of said snaring sections.

7. A trap for garfish comprising a base, a plurality of spaced parallel upright snaring sections secured on said base, said snaring sections including foraminous panels, the meshes of which are graduated as to size with the meshes of one end snaring section larger than the meshes of the remaining snaring sections, a hull supporting said base and adapted to be submerged in a body of water, said hull having reservoirs for air extending along opposite sides thereof, and pipes connected with said reservoirs and through which air may be pumped into the reservoir so as to effect raising of said hull when desired.

LAWRENCE WAGNER.